United States Patent
Kitahara et al.

(10) Patent No.: US 7,889,688 B2
(45) Date of Patent: Feb. 15, 2011

(54) RADIO COMMUNICATION APPARATUS AND TRAFFIC CONTROL METHOD FOR EXTENDING DRIVE-TIME OF BATTERY

(75) Inventors: Takeshi Kitahara, Fujimino (JP);
Hajime Nakamura, Fujimino (JP);
Satoshi Konishi, Fujimino (JP)

(73) Assignee: KDDI Corporation, Tokyo (JP)

( * ) Notice: Subject to any disclaimer, the term of this patent is extended or adjusted under 35 U.S.C. 154(b) by 952 days.

(21) Appl. No.: 11/785,621

(22) Filed: Apr. 19, 2007

(65) Prior Publication Data

US 2007/0248031 A1    Oct. 25, 2007

(30) Foreign Application Priority Data

Apr. 21, 2006 (JP) ............................. 2006-117388

(51) Int. Cl.
*G08C 17/00* (2006.01)
(52) U.S. Cl. ............... 370/311; 455/13.4; 455/571; 455/572; 455/573; 455/574; 455/127.1; 455/69; 455/343.1; 455/343.2; 455/343.3; 455/343.4; 455/343.5; 455/343.6; 455/550.1; 455/551; 455/552.1; 455/553.1; 370/318
(58) Field of Classification Search ............ 370/311, 370/318; 455/69, 571–574, 343.1–343.6, 455/550.1–553.1, 556.2
See application file for complete search history.

(56) References Cited

U.S. PATENT DOCUMENTS

| 5,276,680 | A * | 1/1994 | Messenger | ............ | 370/311 |
| 5,390,165 | A * | 2/1995 | Tuch | ............ | 370/252 |
| 6,005,885 | A * | 12/1999 | Warren et al. | ............ | 375/152 |
| 7,006,522 | B1 * | 2/2006 | Wang et al. | ............ | 370/463 |
| 7,570,613 | B2 * | 8/2009 | Benveniste | ............ | 370/328 |
| 2005/0254459 | A1 * | 11/2005 | Qian | ............ | 370/328 |
| 2006/0171307 | A1 * | 8/2006 | Gopalakrishnan et al. | ... | 370/229 |

FOREIGN PATENT DOCUMENTS

| JP | 7-282857 | A | 10/1995 |
| JP | 07-282857 | A | 10/1995 |
| JP | 09-069787 | A | 3/1997 |
| JP | 9-69787 | A | 3/1997 |
| JP | 3410892 | B2 | 5/2003 |
| JP | 2005-286781 | A | 10/2005 |

OTHER PUBLICATIONS

Thomas F. Fuller et al., "Relaxation Phenomena in Lithium-Ion-Insertion Cells", J. Electrochem. Soc., vol. 141, No. 4, Apr. 1994, pp. 982-990.

Daler Rakhmatov et al., "A Model for Battery Lifetime Analysis for Organizing Applications on a Pocket Computer", IEEE Transactions on Very Large Scale Integration (VLSI) Systems, vol. 11, No. 6, Dec. 2003, pp. 1019-1030.

Japanese Office Action dated Dec. 1, 2010, issued in corresponding Japanese Patent Application No. 2006-117388.

* cited by examiner

*Primary Examiner*—Rafael Pérez-Gutiérrez
*Assistant Examiner*—Lameka J Kirk
(74) *Attorney, Agent, or Firm*—Westerman, Hattori, Daniels & Adrian, LLP (57) ABSTRACT

A radio communication apparatus has a battery, a transmit buffer for temporarily accumulating packets to be sent, a battery state monitoring unit for monitoring a battery state of the battery, and a traffic control unit. The traffic control unit determines a packet burst length and an interval time between the packet bursts in order to obtain charge recovery effect based on the battery state, and controls so as to take out data packets of the packet burst length from the transmit buffer for every interval time between the packet bursts of the packet burst.

9 Claims, 6 Drawing Sheets

RADIO COMMUNICATION APPARATUS AND TRAFFIC CONTROL METHOD FOR EXTENDING DRIVE-TIME OF BATTERY

PRIORITY CLAIM

The present application claims priority from Japanese Patent Application No. 2006-117388 filed on Apr. 21, 2006, which is incorporated herein by reference.

BACKGROUND OF THE INVENTION

1. Field of the Invention

The present invention relates to radio communication apparatus and traffic control method.

2. Description of the Related Art

It is important to maximally extend drive-time of the battery for terminals such as portable telephones or communication-module-equipped terminals with a radio communication facility. Therefore, power-saving is accomplished by controlling transmitted power in the physical layer.

If the transmitted power in the radio communication facility is constant, the amount of current flowing in the power amplifier increases when the battery voltage drops. By the increase of the amount of the current flowing in the power amplifier, the battery voltage will further drop. In order to solve this, there is a technique to control transmitted power based on a battery voltage (for example, as shown in reference 1). According to this technique, the transmitted power can be decreased when the battery voltage deteriorates. Thereby, the amount of the current flowing into the power amplifier decreases, and also the drive-time of the battery is extended.

Also, there is a technique to extend life-time of the battery by controlling the transmission rate depending on a residual quantity of the battery (for example, it refers to reference 2).
(reference 1) Japanese Patent Laid-Open Publication No. 9-069787
(reference 2) Japanese Patent Publication No. 3410892
(reference 3) Japanese Patent Laid-Open Publication No. 7-282857
(reference 4) T. F. Fuller, M. Doyle and J. S. Newman, "Relaxation phenomena in lithium-ion-insertion cells", J. Electroche. Soc., vol. 141, no. 4, April 1994.
(reference 5) D. Rakhmatov, S. Vrudhula, and D. A. Wallach, "A Model for Battery Lifetime Analysis for Organizing Applications on a Pocket Computer," IEEE TRANS. ON VLSI SYSTEMS, vol. 11, no. 6, December 2003.

However, according to reference 1, the transmitted power in the physical layer is controlled. According to reference 2, the transmission rate with the physical layer depending on a battery residual quantity is controlled. That is to say, these techniques do not control communication traffic occurring from applications.

BRIEF SUMMARY OF THE INVENTION

It is therefore an object of the present invention to provide a radio communication apparatus and a traffic control method which can extend drive-time of the battery to the greatest possible extent, from a viewpoint of communication traffic.

According to the present invention, the radio communication apparatus has
a battery,
a transmit buffer for temporarily accumulating packets to be sent,
a battery state monitoring unit for monitoring a battery state of the battery, and
a traffic control unit for determining a packet burst length and an interval time between the packet bursts, in order to obtain charge recovery effect based on the battery state, and for controlling so as to take out data packets of the packet burst length from the transmit buffer for every interval time between the packet bursts.

It is preferred that the traffic control unit controls as follows; in the case that the battery voltage of the battery state is greater than or equal to a predetermined threshold value, the interval time between the packet bursts is shortened, and in the case that the battery voltage is less than the predetermined threshold value, the interval time between the packet bursts is lengthened.

It is preferred that the traffic control unit controls as follows; in the case that the battery residual capacity in the battery state is greater than or equal to a predetermined threshold value, the interval time between the packet bursts is shortened, and in the case that the battery residual capacity in the battery state is less than the predetermined threshold value, the interval time between the packet bursts is lengthened.

Further, it is also preferred that the apparatus has a look-up table for storing the information of the packet burst length and the interval time between the packet bursts corresponding to the battery states, and the traffic control unit refers to the look-up table, and controls so as to take out data packets of the packet burst length from the transmit buffer for every interval time between the packet bursts.

Further, it is also preferred that the apparatus has a voltage control unit for controlling an electric power supply regulator connected to a power amplifier, and the voltage control unit controls as follows; an interval time for controlling voltage of the electric power supply regulator is synchronized with the interval time between the packet bursts of the traffic control unit, and the data packets are not transmitted during the interval time between the packet bursts so that current consumption in the power amplifier becomes lower.

According to the present invention, a method for controlling communication traffic in a radio communication apparatus is provided. The radio communication apparatus includes a battery and a transmit buffer for temporarily accumulating data packets to be sent. The method has the steps of; monitoring a battery state of the battery, determining a packet burst length and an interval time between the packet bursts, in order to obtain charge recovery effect based on the battery state, and controlling so as to take out data packets of the packet burst length from the transmit buffer for every interval time between the packet bursts.

According to the present invention, a method for making a computer to function as a radio communication apparatus is provided. The radio communication apparatus includes a battery and a transmit buffer for temporarily accumulating packets to be sent. The method has the steps of; monitoring a battery state of the battery, determining a packet burst length and an interval time between the packet bursts, in order to obtain charge recovery effect based on the battery state, and controlling to take out data packets of the packet burst length from the transmit buffer every interval time between the packet bursts.

According to the radio communication apparatus and traffic control method of the present invention, it can extend drive-time of the battery utilizing a charge recovery effect to the greatest possible extent, from a viewpoint of communication traffic.

DETAILED DESCRIPTION OF THE INVENTION

The present invention expects a charge recovery effect of the battery. This effect is realized in various batteries, particularly in the lithium-ion battery. When a large amount of the current is required compared to the battery capacity, the battery drive-time in the case that discharge is performed intermittently is longer than the battery drive-time in the case that discharge is performed continuously. The present invention enables to reduce the battery loads by transmitting data packets intermittently. Thereby, the drive-time of the battery is extended.

Figure 1:
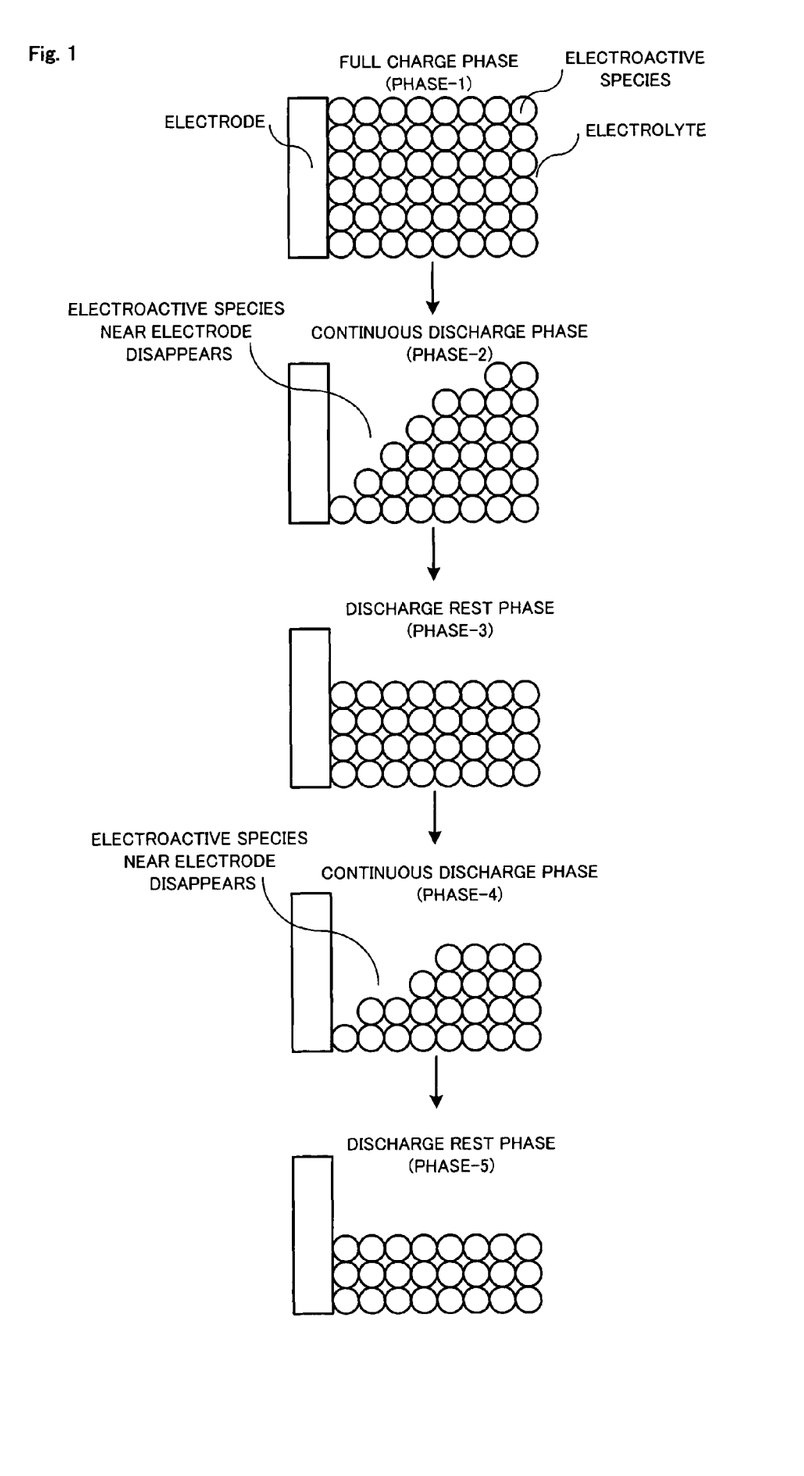
FIG. 1 shows the illustration of the charge recovery effect.

FIG. 1 shows the illustration of the charge recovery effect.

According to FIG. 1, electroactive species in electrolyte exists near an electrode. Electroactive species near the electrode is taken into the electrode while discharging, and electroactive species disappear.

In a full charge phase (phase 1), electroactive species adhere to the whole surface of the electrode. Then, in a continuous discharge phase (phase 2), electroactive species near the surface of the electrode will decrease. When a large current compared to the capacity of the battery is discharged, electroactive species near the electrode will decrease rapidly and drastically. So, in phase 2, the electroactive species fall and form a slope against the electrode. This phase leads to a sudden drop of the battery voltage caused by continuous discharge.

Then, in a discharge rest phase (phase 3), height of the electroactive species is averaged, and the electroactive species near the surface of the electrode is increased. This phase shows "a charge recovery effect" which enables to extend drive-time of the battery by intermittent discharge.

In a continuous discharge phase (phase 4), electroactive species near the surface of the electrode disappear again. Then, in a discharge rest phase (phase 5), height of the electroactive species is averaged, that is to say, the electroactive species near the surface of the electrode is increased.

Figure 2:
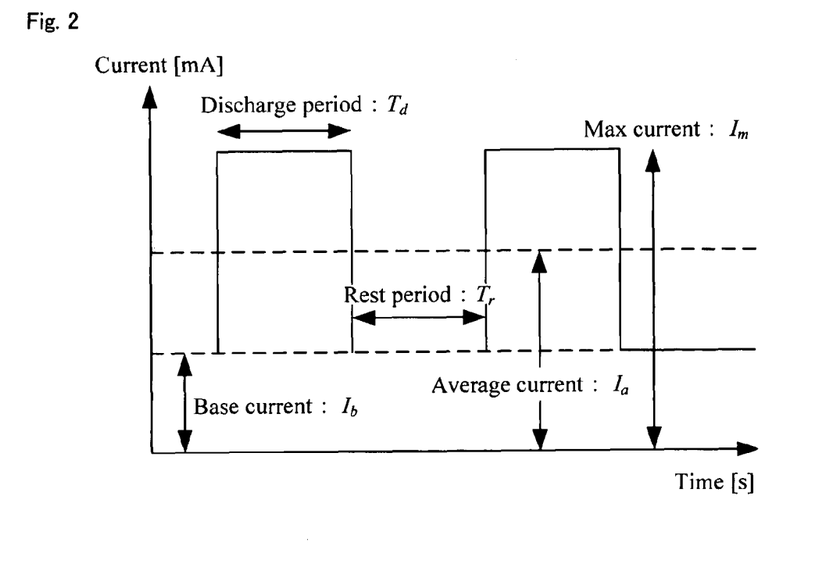
FIG. 2 shows the illustration of the pulse discharge.

FIG. 2 shows the illustration of the pulse discharge.

According to FIG. 2, intermittent discharge is represented as continuous discharge period Td, discharge rest period Tr, maximum discharge current Im, constantly flowing current Ib, and average current Ia.

Figure 3:
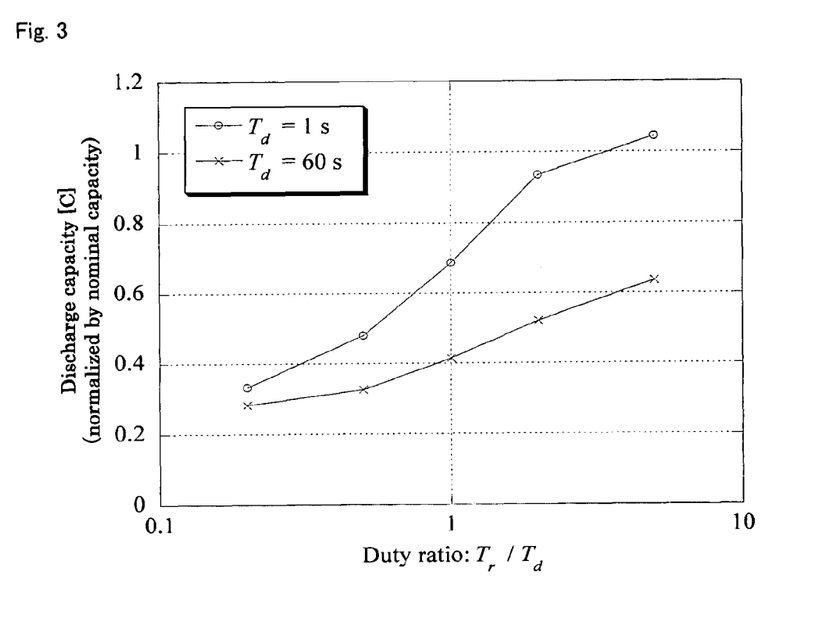
FIG. 3 is a graph showing the experimental result of the discharge capacity, using the parameter set of Table 1.

FIG. 3 is a graph showing the experimental result of the discharge capacity, using the parameter set of Table 1.

TABLE 1

| | | Parameter set 1 | | | |
|---|---|---|---|---|---|
| ID | Im [CA] | Ib [CA] | Td [sec] | Tr [sec] | Ia [CA] |
| 1 | 5 | 0.2 | 1 | 0.2 | 4.2 |
| 2 | 5 | 0.2 | 1 | 0.5 | 3.4 |
| 3 | 5 | 0.2 | 1 | 1 | 2.6 |
| 4 | 5 | 0.2 | 1 | 2 | 1.8 |
| 5 | 5 | 0.2 | 1 | 5 | 1.0 |
| 6 | 5 | 0.2 | 60 | 12 | 4.2 |
| 7 | 5 | 0.2 | 60 | 30 | 3.4 |
| 8 | 5 | 0.2 | 60 | 60 | 2.6 |
| 9 | 5 | 0.2 | 60 | 120 | 1.8 |
| 10 | 5 | 0.2 | 60 | 300 | 1.0 |

According to FIG. 3, the horizontal axis shows the duty ratio Tr/Td, and the longitudinal axis shows the discharge capacity normalized by the nominal capacity.

Nominal capacity is a capacity nominally presented by battery manufacturers, and will vary with the discharge methods. The unit of the nominal capacity is Ah (ampere hour).

A discharge capacity is the capacity actually obtained from the battery, and is directly related to the drive-time of the battery. The current amount is referred to as "C-Rate", according to D. Linden, and T. B. Reddy, Handbook of batteries 3rd edition, McGraw-Hill, section 3.4, 2001. When the nominal capacity of the battery is 1C, the rate of the discharged current is shown as x[CA]. For example, in the case of a battery of nominal capacity 1000 mAh, 1c=1000 mAh and 1CA=1000 mA.

According to FIG. 3, the discharge capacity is increased by lengthening the discharge rest period and enlarging the duty rate. That is to say, the discharge capacity can be increased by discharging intermittently.

Figure 4:
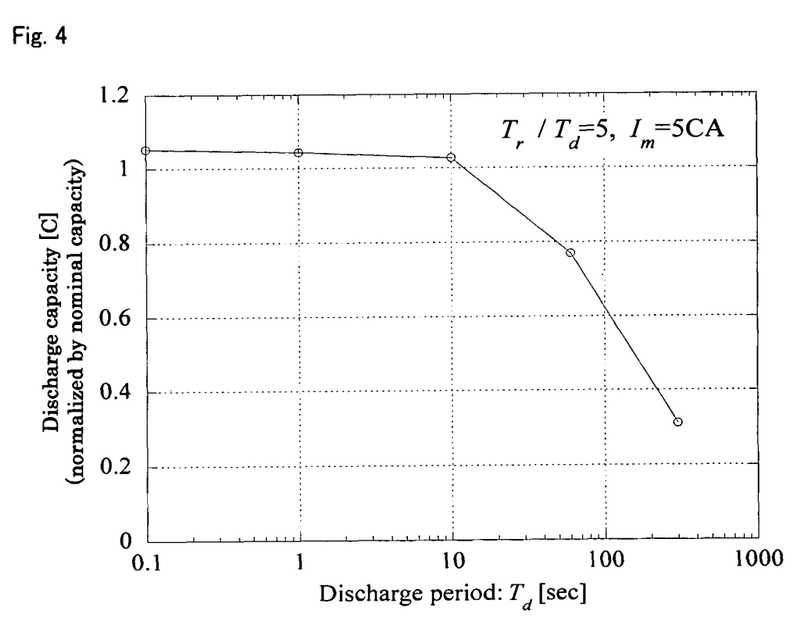
FIG. 4 is a graph showing the experimental result of the discharge capacity, using the parameter set of Table 2.

FIG. 4 is a graph showing the experimental result of the discharge capacity, using the parameter set of Table 2.

TABLE 2

| | | Parameter set 2 | | | |
|---|---|---|---|---|---|
| ID | Im [CA] | Ib [CA] | Td [sec] | Tr [sec] | Ia [CA] |
| 11 | 5 | 0.2 | 0.1 | 0.5 | 1.0 |
| 12 | 5 | 0.2 | 1 | 5 | 1.0 |
| 13 | 5 | 0.2 | 10 | 50 | 1.0 |
| 14 | 5 | 0.2 | 60 | 300 | 1.0 |
| 15 | 5 | 0.2 | 300 | 1500 | 1.0 |

According to FIG. 4, the duty ratio is constant, and the horizontal axis shows continuous discharge period Td, where the longitudinal axis shows the discharge capacity. According to FIG. 4, the discharge capacity will decrease when Td becomes equal to or greater than 10 sec, even if the duty ratio is constant. That is to say, if the continuous discharge period becomes equal to or greater than 10 sec, charge recovery effect cannot be obtained and the discharge capacity will decrease even when discharged intermittently.

Figure 5:
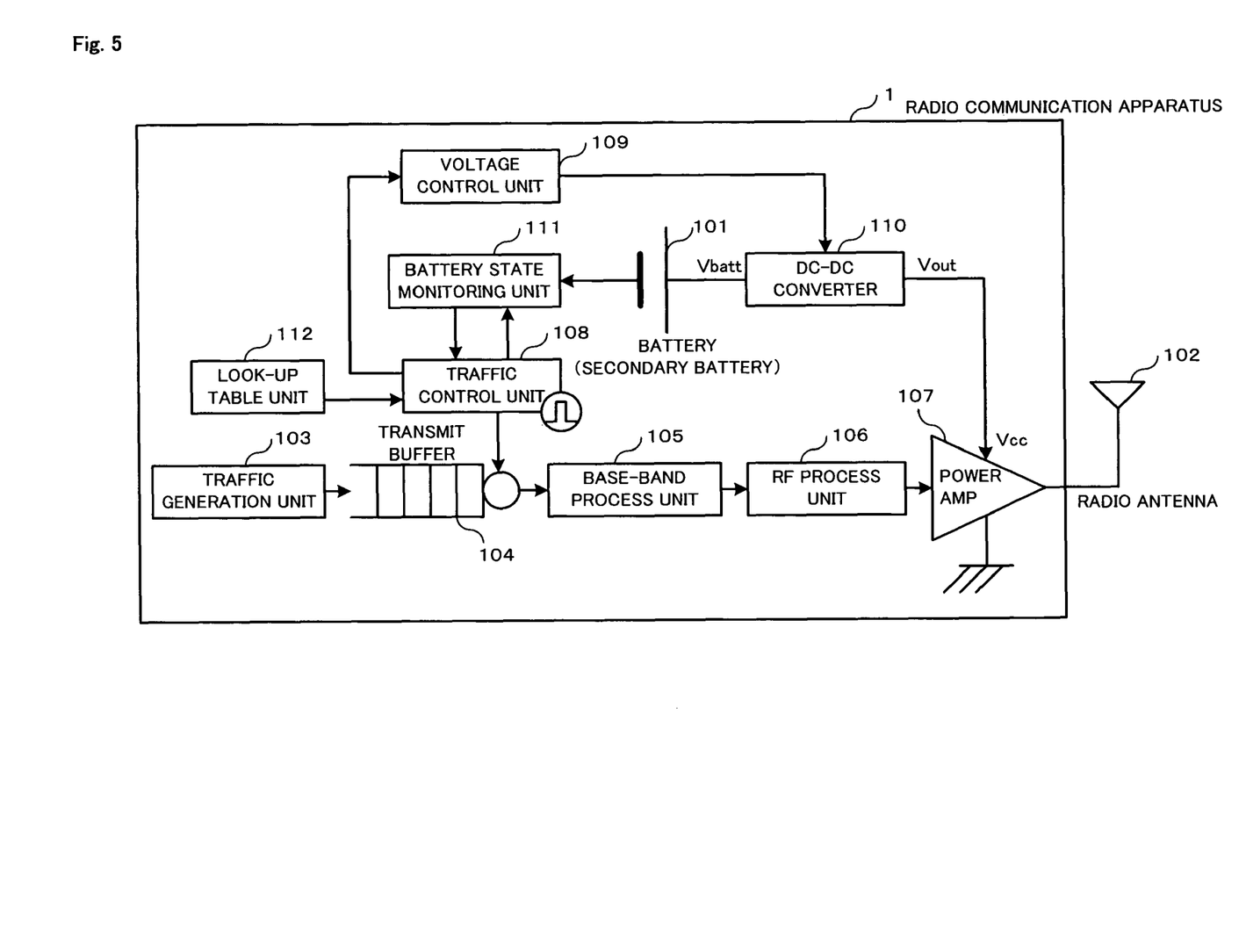
FIG. 5 shows the facility configuration diagram of the radio communication apparatus of the present invention.

FIG. 5 shows a functional configuration diagram of the radio communication apparatus of the present invention.

Radio communication apparatus 1 of FIG. 5 has a battery 101, a radio antenna 102, a traffic generating unit 103, a transmit buffer 104, a base-band process unit 105, an RF (Radio Frequency) process unit 106, a power amplifier unit 107, a traffic control unit 108, a voltage control unit 109, a DC-DC converter (an electric power supply regulator) unit 110, a battery state monitoring unit 111 and a look-up table unit 112. In particular, traffic control unit 108, voltage control unit 109, battery state monitoring unit 111 and look-up table unit 112 can be realized by the program to execute a computer installed in radio communication apparatus 1.

For example, battery 101 is a lithium-ion battery. Lithium-ion battery is secondary battery and has high energy density, which means small and light in weight. Thus, it is suitable for radio communication apparatus such as portable telephones.

Traffic generating unit 103 is one of various kinds of application programs for data communication. This generates data packets and outputs the packets to transmit buffer 104.

Transmit buffer 104 temporarily accumulates data packets. Transmit buffer 104 outputs one or more packets to base-band process unit 105 depending on the designation from traffic control unit 108. Hereinafter, "packet" means a unit of output from traffic generating unit 103, and "packet burst" means one or more packet sequences in one transmission.

Base-band process unit 105 processes the base-band modulation for data taken from transmit buffer 104. RF process unit 106 executes an up-conversion process of the RF band for modulating signal outputted from base-band process unit 105. The RF signals are forwarded to power amplifier 107.

Power amplifier 107 amplifies RF signal, and the RF signal is transmitted from radio antenna 102.

DC-DC converter unit 110 is an electric power supply regulator for power amplifier unit 107. DC-DC converter unit 110 controls output voltage Vout depending on a designation of voltage control unit 109. Further, according to the existing DC-DC converter, the accuracy of the output voltage Vout can be improved. Thereby, current consumption of power amplifier 107 can be reduced, and thus, the output current of the battery can be reduced.

Voltage control unit 109 controls DC-DC converter unit 110 connected to power amplifier unit 107. An interval time for controlling voltage of the DC-DC converter unit 110 is synchronized with the interval time between the packet bursts of the traffic control unit 108. DC-DC converter unit 110 operates so that the power dissipation (synonymous with "current consumption") of the power amplifier decreases during the interval time in which data is not being transmitted.

During the period while data is flowing into power amplifier unit 107, the data are transmitted by minimum transmitted power. On the other hand, during the period while data signals are not flowing into power amplifier unit 107, consumption current can be suppressed.

In radio communication apparatus such as portable telephones, the power consumption in the power amplifier is large. In general, in the case of audio communication in telephone communication, the transmission rate is reduced while the user is not talking (the period while audio signals are not transmitted). This technique suppresses the power consumption of the power amplifier by suppressing the radiation of the electric wave. However, in the case of data communication, the battery becomes exhausted quickly because the power amplifier works continuously. Also, drive-time of the battery shortens rapidly. According to the present invention, in data communication, the power consumption of power amplifier unit 107 can be reduced while data are not transmitted. Thereby, it can extend the drive-time of the battery.

Battery state monitoring unit 111 always monitors the battery state. The battery state is the battery voltage and/or the battery residual capacity. The battery voltage is detected from battery 101. The battery residual capacity is predicted based on the parameter of the battery voltage, the charge and discharge history or the temperature (for example, it refers to non-patent document 3). Then, battery state monitoring unit 111 notifies the battery state information to traffic control unit 108. The battery state information may be notified periodically, or may be notified when requested by traffic control unit 108.

Traffic control unit 108 indicates that more than one packet is taken out from transmit buffer 104, and is sent to base-band process unit 105. Traffic control unit 108 controls the packet burst length and the interval time between the packet bursts. The packet burst length and the interval time between the packet bursts are determined so that the charge recovery effect can be obtained based on the battery state provided from the battery state monitoring unit 111. The interval time between the packet bursts is the time between the first packet burst consisting of more than one packet to be transmitted in one time, and the second packet burst which is to be transmitted next. The packet burst length must be shorter than the possible continuous discharge period (according to FIG. 3, less than 10 sec).

In the case where the battery voltage or the predicted battery residual capacity in the battery state is greater than or equal to the predetermined threshold value, traffic control unit 108 lengthens the packet burst length and/or shortens the interval time between the packet bursts. On the other hand, when a battery voltage or a predicted battery residual capacity is smaller than the predetermined threshold value, traffic control unit 108 shortens the packet burst length and/or lengthens the interval time between the packet bursts. The packet burst length and interval time between the packet bursts corresponding to the battery voltage or the predicted battery residual capacity may be registered beforehand in look-up table unit 112. Traffic control unit 108 refers to look-up table unit 112, and determines the packet burst length and the interval time between the packet bursts.

Look-up table unit 112 registers the experimental value or the simulation value of the discharging time interval where charge recovery effect can be obtained, for every battery state (the battery voltage, the predicted battery residual capacity or the past charge and discharge history) (for example, it refers to non-patent document 5). In addition, as a simple method, discharging time interval may be registered as T1 if the battery voltage (battery state) is equivalent to or greater than the threshold Vth, and the discharging time interval may be registered as T2(>T1) if the battery voltage is less than Vth, for example.

A display part of the portable telephones shows the battery residual capacity in three phases, for example. Here, the time between the second phase (mid-residual quantity) and the first phase (low-residual quantity) is extremely shorter than the time between the third phase (full charge) and the second phase (mid-residual quantity). For example, in the case of a lithium-ion battery (4.2V) used for portable phones, when its voltage becomes lower than 3.5V, time for reaching cut off voltage suddenly becomes short. Thus, for example, threshold value Vth can be 3.5V. Also, for example, the data time interval T1 is 10 ms, and, for example, T2 is 100 ms.

Figure 6:
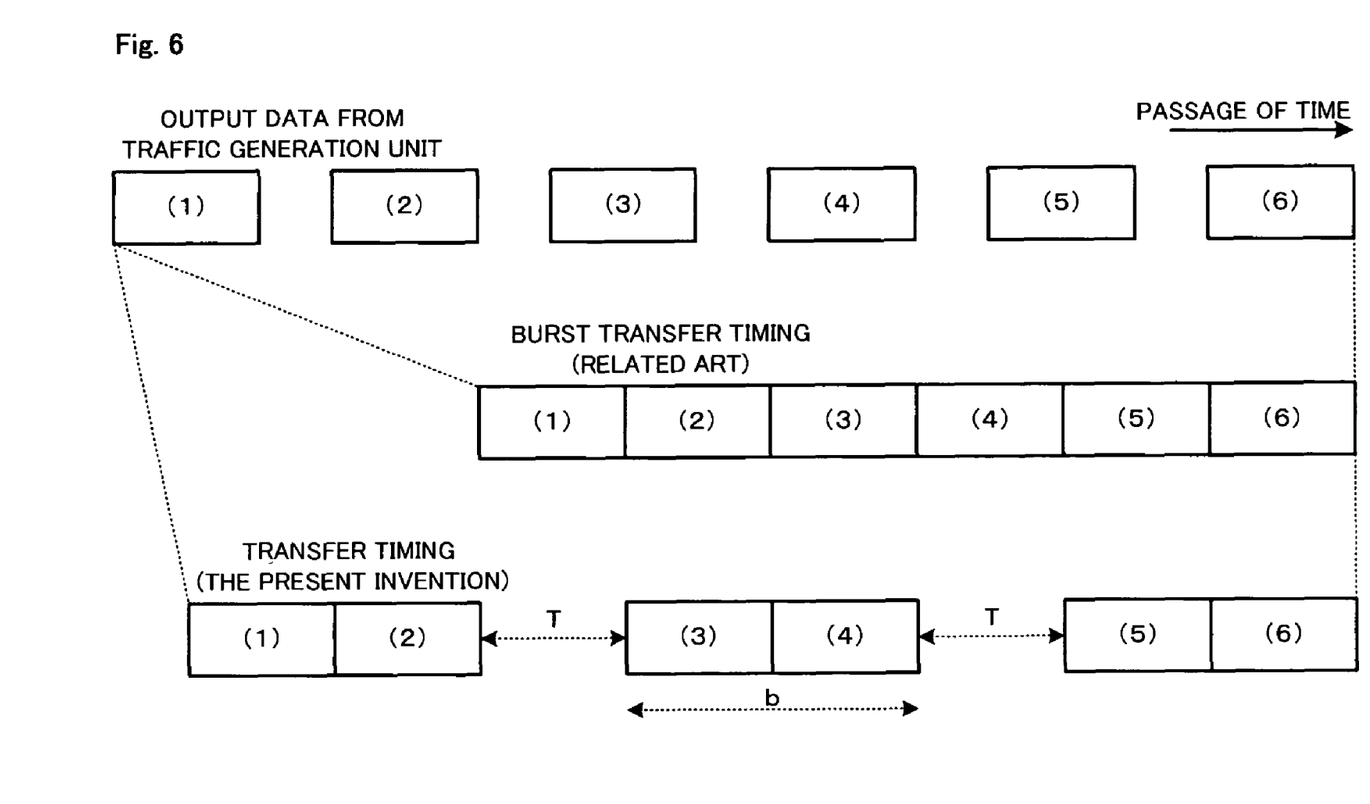
FIG. 6 illustrates an interval time between the packet bursts.

FIG. 6 illustrates an interval time between the packet bursts.

According to the prior art, the packet bursts are transmitted continuously. In contrast, according to the present invention, the packet bursts are transmitted intermittently. Thereby, a charge recovery effect can be obtained. The best charge recovery effect is obtained by ensuring an interval time between the packet bursts per one packet transmission. However, on the other hand, the transmission rate would deteriorate.

Here, traffic control unit 108 controls in a way that the packet burst length b is taken out from transmit buffer 104 and is transmitted at once. That is to say, traffic control unit 108 executes traffic shaping action which transmits each of packet bursts of length b is sent for every interval time T between the packet bursts. Traffic shaping is realized by the mechanism of "token bucket", for example.

Figure 7:
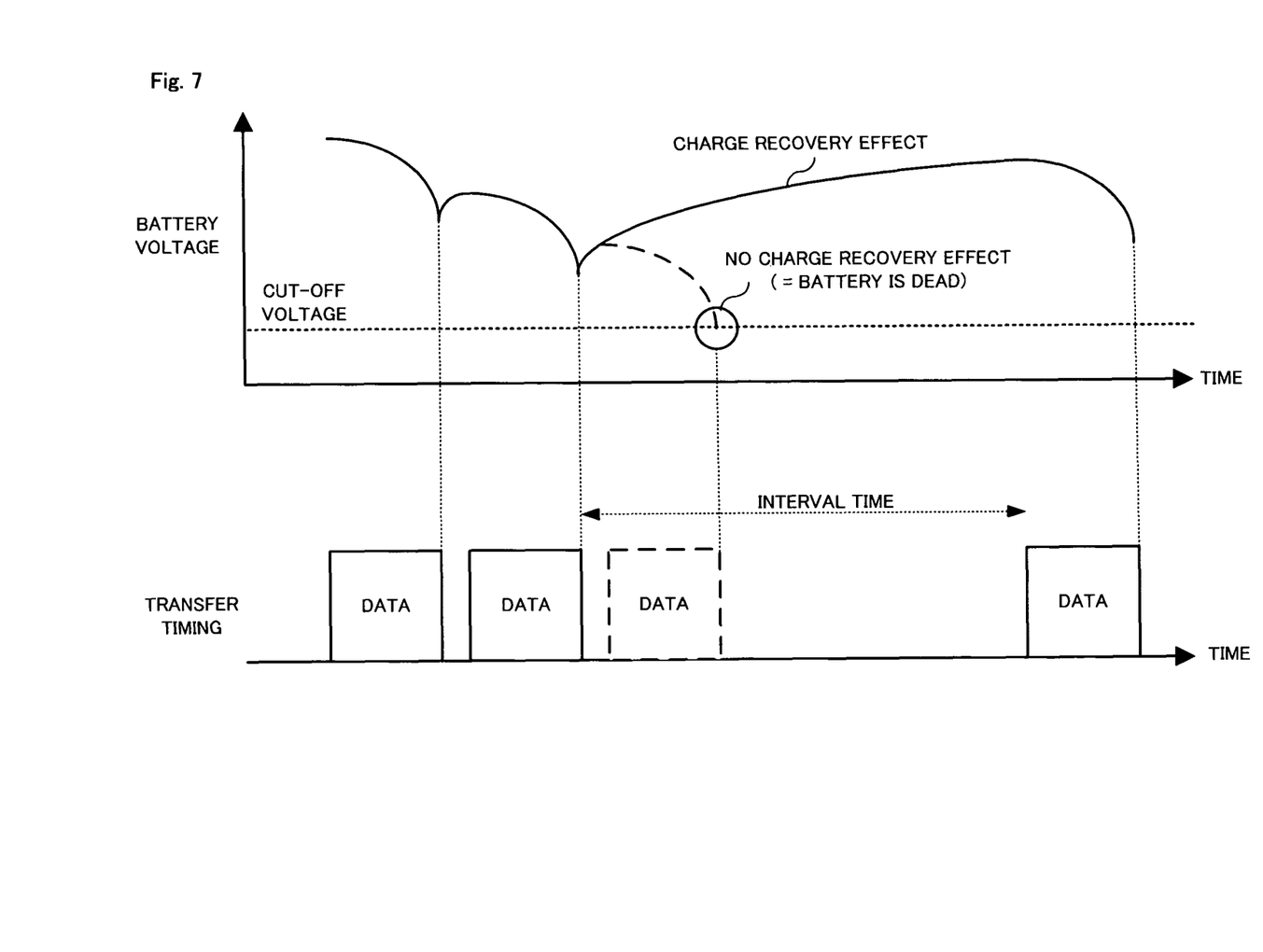
FIG. 7 illustrates a charge recovery effect of the present invention.

FIG. 7 illustrates a charge recovery effect of the present invention.

FIG. 7 shows the difference between the cases with and without the charge recovery effect. Without the charge recovery effect, the third data packet bursts cannot be sent because time before reaching the cut off voltage is short. In contrast, by incorporating time intervals of packet bursts to obtain charge recovery effect, the third packet bursts can be sent.

The present invention mainly consists of two functions. The first function is to control the communication traffic to be transmitted, so that the charge recovery effect is obtained. The second function is to synchronize with the interval time between the packet bursts, and to control the current consumption in the power amplifier. Utilizing those functions, the drive-time of the battery is extended.

As explained above, according to the radio communication apparatus and the communication traffic control method of the present invention, the drive-time of the battery can be extended to the greatest possible extent by charge recovery effect, from the viewpoint of communication traffic.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A radio communication apparatus comprising:
   a battery,
   a transmit buffer for temporarily accumulating packets to be sent,
   a battery state monitoring means for monitoring a battery state of the battery, and
   a traffic control means for determining a packet burst length and a length of an interval time interposed between adjacent packet bursts, based on the monitored battery state, in order to obtain charge recovery effect, and for taking out the packets from the transmit buffer and transmitting a packet burst intermittently, with the determined packet burst length and the determined interval time.

2. The apparatus as claimed in claim 1, wherein the traffic control means determines the interval time, such that, when a battery voltage of the battery state is greater or equal than a predetermined threshold value, the interval time is shortened, and
   when the battery voltage is less than the predetermined threshold value, the interval time is lengthened.

3. The radio communication apparatus as claimed in claim 1, wherein the traffic control means
   determines the interval time, such that a battery residual capacity in the battery state is greater or equal than a predetermined threshold value, the interval time is shortened, and
   when the battery residual capacity in the battery state is less than the predetermined threshold value, the interval time is lengthened.

4. The radio communication apparatus as claimed in claim 1, wherein the apparatus further comprises a look-up table for storing information of packet burst lengths and interval times between the packet bursts, corresponding to the battery state, and
   the traffic control means refers to the look-up table, for determining the packet burst length and the length of the interval time.

5. The radio communication apparatus as claimed in claim 1, wherein the apparatus further comprises a voltage control means for controlling an electric power supply regulator connected to a power amplifier,
   the voltage control means controls
   the electric power supply regulator, such that an interval period for controlling voltage of the electric power supply regulator is synchronized with the interval time of the traffic control means, and
   such that, during the interval time in which no data is transmitted, a consumption current in the power amplifier becomes lower.

6. A method for controlling communication traffic in a radio communication apparatus that includes a battery and a transmit buffer for temporarily accumulating packets to be sent, the method comprising the steps of:
   monitoring a battery state of the battery,
   determining a packet burst length and a length of an interval time interposed between adjacent packet bursts, based on the monitored battery state, in order to obtain charge recovery effect, and
   by taking out the packets from the transmit buffer, transmitting a packet burst intermittently, with the determined packet burst length and the determined interval time.

7. A method for making a computer to function as a radio communication apparatus that include a battery and a transmit buffer for temporarily accumulating packets to be sent, the method comprising the steps of:
   monitoring a battery state of the battery,
   determining a packet burst length and a length of an interval time interposed between adjacent packet bursts, based on the monitored battery state, in order to obtain charge recovery effect, and
   by taking out the packets from the transmit buffer, transmitting a packet burst intermittently, with the determined packet burst length and the determined interval time.

8. A method for controlling communication traffic in a radio communication apparatus that includes a battery and a transmit buffer for temporarily accumulating packets to be sent, the method comprising the steps of:
   monitoring a battery residual capacity of the battery;
   based on the monitored battery residual capacity, determining a length of an interval time interposed between adjacent packet bursts, such that the monitored battery residual capacity is greater or equal than a predetermined threshold value, the interval time is shortened, and when the monitored battery residual capacity is less than the predetermined threshold value, the interval time is lengthened; and
   by taking out the packets from the transmit buffer, transmitting a packet burst intermittently, with the determined interval time.

9. The method according to claim 6, wherein the step of taking includes a sub-step of determining the packet burst length and the length of the interval time, such that, when the monitored battery state is good, the packet burst length is lengthened and the interval time is shortened, and when the monitored battery state is poor, the packet burst length is shortened and the interval time is lengthened.

* * * * *